Sept. 16, 1924.

G. E. CASSEL 1,508,644

SPEED INDICATING APPARATUS

Filed July 9, 1923    4 Sheets-Sheet 1

Inventor.
Gunnar E. Cassel,
by [signature] atty.

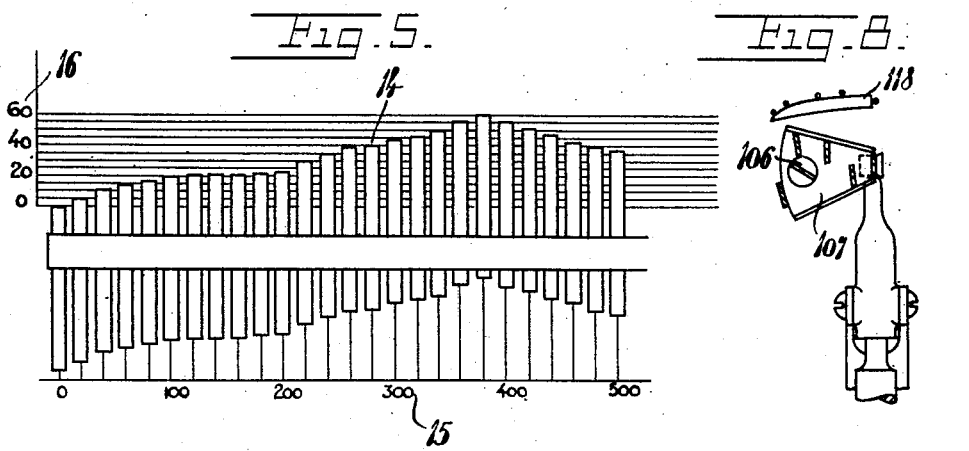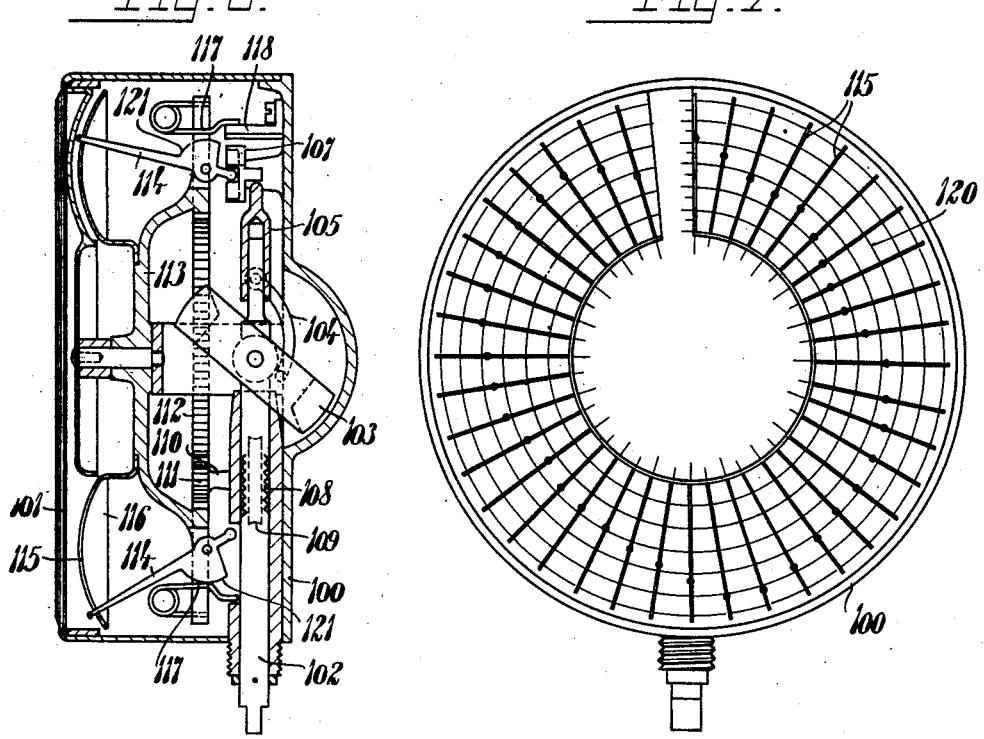

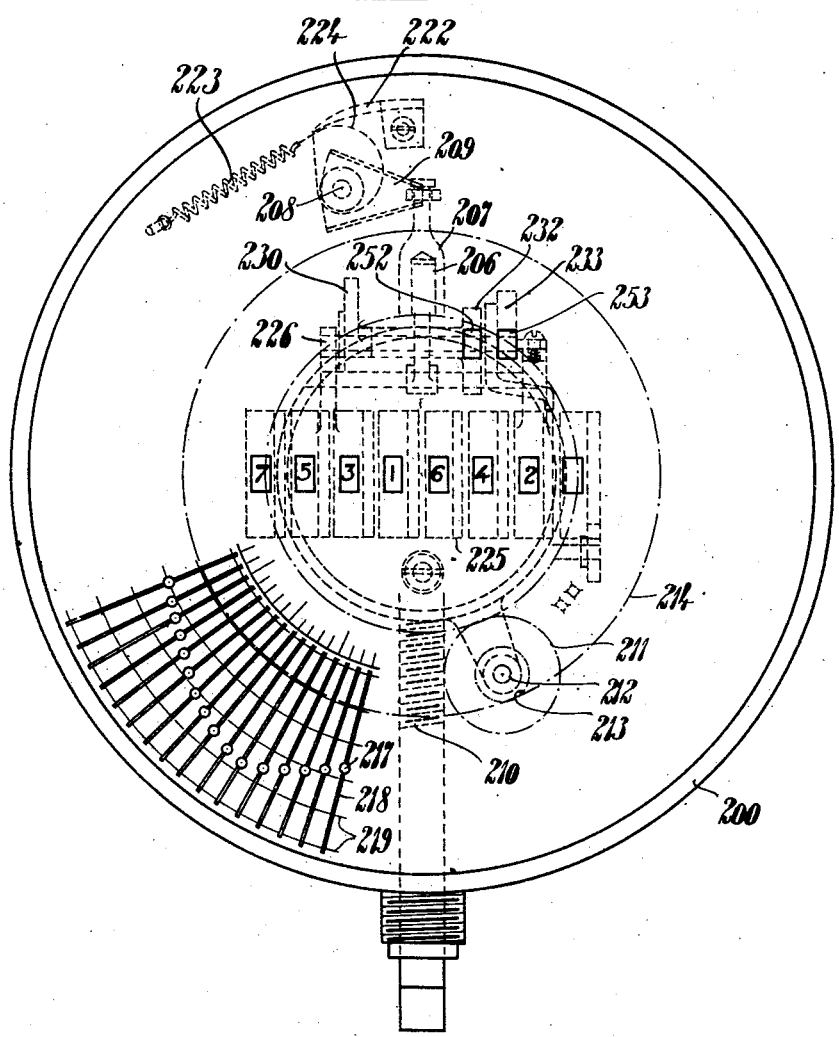

Sept. 16, 1924.  
G. E. CASSEL  
SPEED INDICATING APPARATUS  
Filed July 9, 1923   4 Sheets-Sheet 4
1,508,644
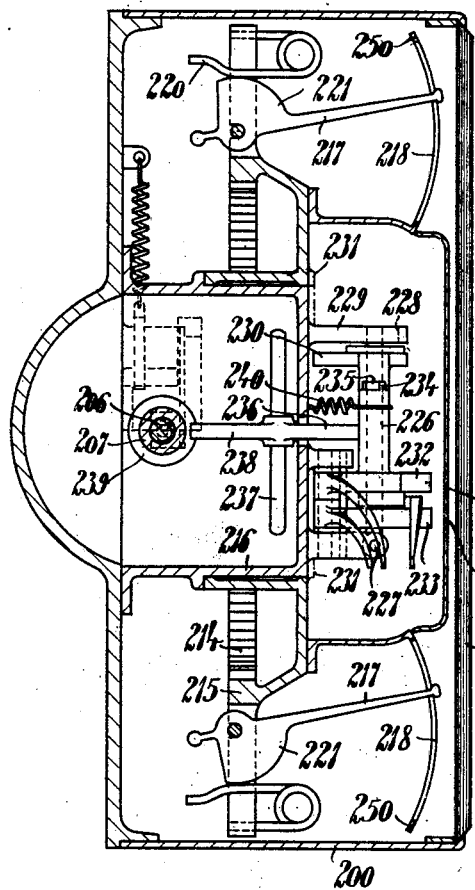
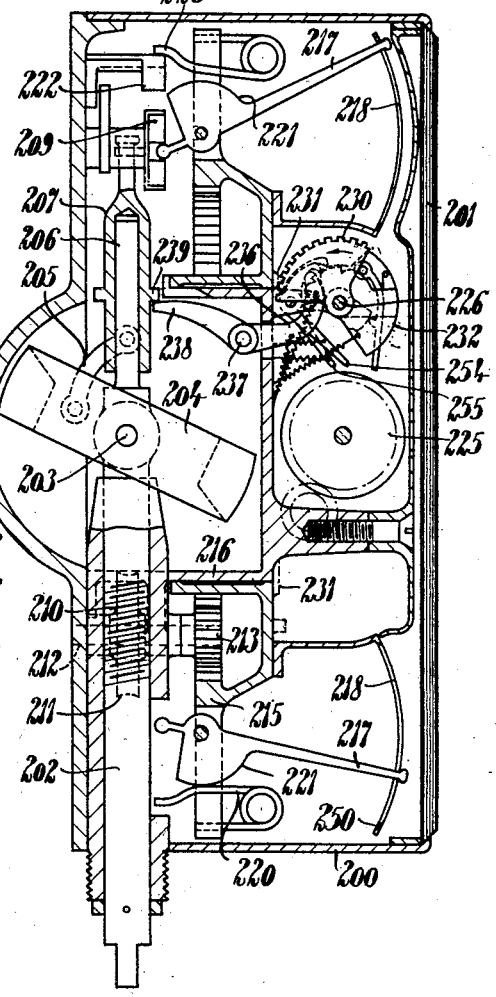
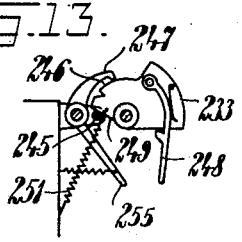
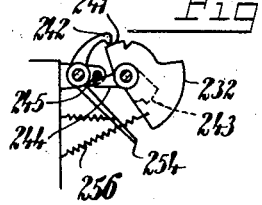
Inventor  
Gunnar E. Cassel Patented Sept. 16, 1924.

1,508,644

UNITED STATES PATENT OFFICE.

GUNNAR ELIAS CASSEL, OF STOCKHOLM, SWEDEN, ASSIGNOR TO ARTUR LEFFLER, OF DJURSHOLM, SWEDEN.

SPEED-INDICATING APPARATUS.

Application filed July 9, 1923. Serial No. 650,445.

*To all whom it may concern:*

Be it known that I, GUNNAR ELIAS CASSEL, a citizen of the Kingdom of Sweden, residing at Stockholm, Sweden, have invented new and useful Improvements in Speed-Indicating Apparatus, of which the following is a specification.

The present invention relates to a speed indicating apparatus for motor vehicles.

An object of this invention is to provide an apparatus of the said kind which automatically may produce a temporary indication of the speeds of the vehicle during a limited distance which always terminates at that point of the road travelled where the vehicles is when the reading takes place. The said indicating operation includes a temporary setting of adjustable pins under the control of a centrifugal governor (or tachometer) driven from the vehicle in synchronism with the speed of the vehicle at each moment so that the pins, when set, will represent a speed diagram of the distance last travelled, and after a certain distance has been travelled subsequent to the setting of any pin the latter will be restored automatically.

Another object of the invention is to provide an apparatus of the said kind in which levers pivotally mounted in a rotatable disk are successively set into positions corresponding exactly to the speed of the vehicle at the moment at which said setting operation is effected under the control of a centrifugal governor (or tachometer).

A still further object of the invention is to provide an apparatus of the kind set forth which does not only indicate the speed of the vehicle at each moment under the control of the governor but also gives an indication of the maximum speed or another predetermined speed during one or more predetermined distances.

Figure 1:
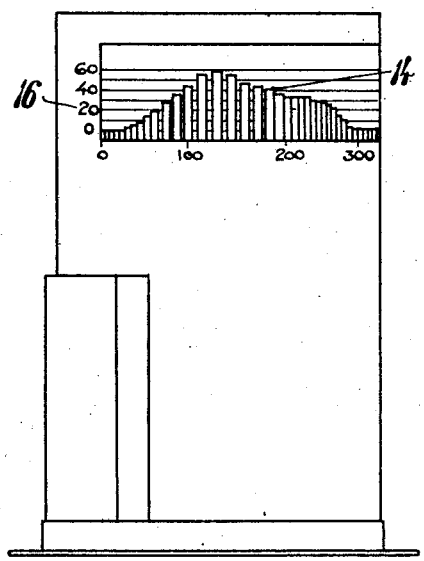
Figure 3:
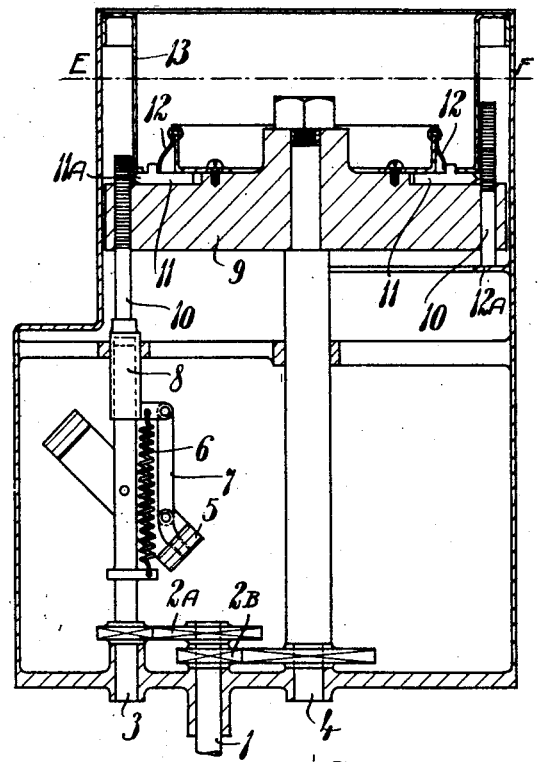
Figure 2:
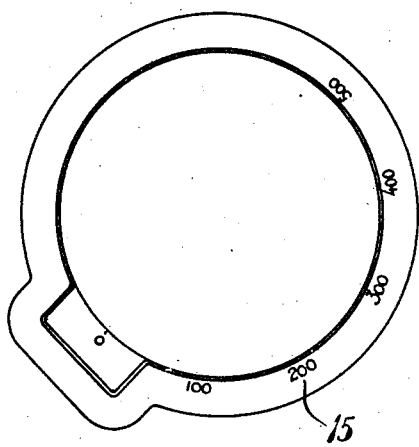
Figure 4:
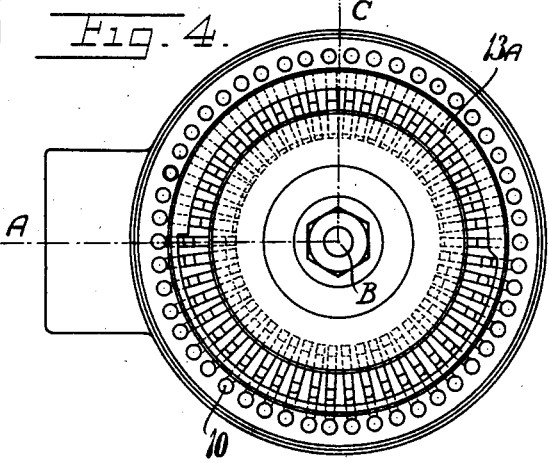

The above said and other objects of the invention will more clearly appear from the following detailed description of some embodiments of the invention reference being had to the accompanying drawings in which:

Figure 1 is an elevation and Fig. 2 a plan view of an apparatus according to one embodiment of this invention. Fig. 3 is a vertical section on the line A—B—C in Fig. 4, and Fig. 4 is a horizontal section on the line E—F in Fig. 3. Fig. 5 is a development of a speed diagram taken with the apparatus shown in Figs. 1–4.

Fig. 6 is a vertical cross section of an apparatus according to a second embodiment of the invention. Fig. 7 is a front elevation of this apparatus. Fig. 8 is a detail view.

Fig. 9 is a front elevation with parts removed of an apparatus according to a third embodiment of the invention. Fig. 10 is a cross section of this apparatus taken at right angles to its driving shaft. Fig. 11 is a cross section of the apparatus taken in the longitudinal direction of the driving shaft. Figs. 12 and 13 are detail views.

With reference to Figs. 1–5, the shaft 1, Fig. 3, is connected through suitable means (not shown) with any of the wheels of the vehicle (not shown) on which the apparatus is used so as to rotate with an angular velocity proportional to the angular velocity of said wheel. The gears $2^A$ and $2^B$ transmit the rotary movement of shaft 1 to shafts 3 and 4 respectively. The shaft 3 which rotates at a comparatively high speed carries a centrifugal governor (or tachometer) which, while it may be of any type desired is herein shown as a ring 5 mounted to rotate with the shaft 3 while at the same time being free to swing about an axis at right angles thereto. The swinging movement of the ring 5 is counter-balanced by a spring 6 so that the ring will assume a more or less inclined position relatively to the shaft 3 according as the number of revolutions of shaft 3 varies. A link 7 transmits the swinging movement of the ring 5 to a slidably mounted sleeve 8 the vertical position of which will thus depend on the speed of the vehicle. The shaft 4 which is driven at a comparatively low speed carries a drum or disk 9 fastened to the shaft 4, said drum having near its periphery a series of vertical borings loosely engaged by pins 10 mounted to slide in said borings. The pins 10 may be easily displaced in the vertical direction of said borings but may be held against movement by locking members or pawls 11 formed at their fore ends as knife-edges $11^A$ and acted on by springs 12 tending to push the pawls forward to cause them to engage the pins 10 which may be formed with teeth or serrations to facilitate such engagement as will appear from Fig. 3. The disk 9 is positioned so as to cause all of the pins 10 upon the rotation of the disk to successively pass exactly above the sleeve 8. A cylinder 13 attached to the frame of the apparatus serves to release each pawl from its respective pin immediately before the pin passes over the sleeve 8, said cylinder 13 being provided to this end with a cam 13^A adapted, when the disk rotates, to push each pawl 11 away from its pin. The pins rest with their lower ends on a helical surface 12^A till they reach a point exactly above the sleeve 8 where the said surface terminates. The pins will then successively drop down on the sleeve 8 to be thereupon immediately locked in the position determined by the sleeve 8 due to the fact that the pawls 11 are released upon the continued rotation of the disk 9 and allowed to again lock the corresponding pins. Upon the continued rotation of disk 9 a number of pins adjusted into different heights will thus successively appear. Said pins will remain in their set positions during a period of time corresponding for instance to half a revolution of the disk 9. The pins set are visible from outside through a window formed in the casing of the apparatus and the upper ends of the pins will represent a curve, as shown at 14 (Figs. 1 and 5). A circumferentially extending graduation 15 at the bottom of said curve represents the distance (as for instance 500 m.) last travelled, while a graduation 16 in the window or on the cylinder 13 represents the speed which is indicated by the upper ends of the operated pins for successive points of the distance last travelled by the vehicle.

After a pin has moved 180° away from the sleeve 8 the corresponding pawl is released by the cam 13^A of the cylinder 13, said cam being shaped so as to allow the pin to be in released condition until again passing above the sleeve 8. During this period the pin is lifted by the helical surface 12^A to a level corresponding to the highest speed possible of the vehicle. The pin, having completed a cycle of movement and again reaching the sleeve, may be again set in the manner described. It should be noted that all writing pencils or similar appliances for recording the speed are dispensed with.

With reference to the apparatus illustrated in Figs. 6–8, the numeral 100 indicates the casing of the apparatus. Said casing is covered at its front by a disk of glass 101. Mounted within the casing near the rear wall thereof is a shaft 102 adapted to be driven from any of the wheels of the vehicle on which the apparatus is used or from any other member rotating synchronously therewith. The shaft 102 carries the governor weight 103 mounted in an oblique position and connected by a link 104 to a sleeve 105 slidable in an up and down position on the shaft 102. The upper end of the sleeve 105 is adapted to engage a channel-shaped guide-way 107 pivotally mounted on the journal 106 (Fig. 8) the side-walls of said guide-way converging towards the free end thereof. The shaft 102 is formed as an endless screw, as shown at 108 engaged by a worm wheel 109 fixed on an intermediate shaft 110. Carried by the said shaft 110 is also a toothed pinion 111 in engagement with an internally toothed rim 112 formed on a rotatably mounted disk 113. Pivotally mounted in said disk are a great number of levers 114 forming together an annular series of levers concentric to the axis of the disk 113. The longer ends of said levers 114 engage in radial guide-ways or slots 115 formed in a dial 116 rigidly attached to the disk 113, said dial having, preferably, a number of circular scores 120 (Fig. 7) corresponding to different speed (as froom 0 to 60 km. an hour). The shorter ends of the levers 114 engage the guide-way 107 when passing there above during the rotation of the disk 113, thereby setting the levers into positions corresponding exactly to the speed at which the vehicle is travelling at the moments at which the setting operations take place, that is the moments at which the said shorter ends of the levers leave the narrow end of the guide-way 107. To maintain the levers in their set positions each lever is acted on by a holding spring 117 engaging a surface 121 of the lever which is concentric to the journal of the lever. Said spring is lifted out of engagement with said surface by a fixed guide-way or cam 118 immediately as the shorter end of the lever engages the guide-way 107 so that the setting of the lever may take place without causing any perceptible resistance on the governor. The ratio of gearing existing between the shaft 102 and the disk 113 may, for instance, be adjusted so that, while the vehicle travels a distance of 750 meters, the disk performs a sufficient rotation to cause any of the levers to move from the narrow end of the guide-way 107 and back to the wider end of the guide-way. During said part of the revolution the respective levers are maintained against rotation by their springs and will represent by their ends projecting above the dial a speed diagram for the 750 m. last travelled by the vehicle, as shown in Fig. 7.

With reference to the embodiment shown in Figs. 9–13, the numeral 200 indicates the casing of the apparatus which is covered at its front by a disk of glass 201. Rotatably mounted in the casing 200 is a shaft 202 adapted to be driven from any of the wheels of the vehicle or from a member rotating synchronously therewith. The shaft 202 carries by means of angularly projecting pins 203 an obliquely mounted governor weight 204 connected by a link 205 to a sleeve 207 slidably mounted on an extension 206 of the shaft 202. This sleeve 207 is pivotally connected at its upper end to a channel-shaped guide-way 209 pivoted at 208 the side-walls of which converge in the direction away from the pivot 208 towards the connection with sleeve 207. The shaft 202 is shaped as an endless screw as shown at 210 engaged by a worm wheel 211 on an intermediate shaft 212. The shaft 212 carries also a toothed pinion 213 in engagement with an internally toothed rim 214 formed on a disk 215 rotatably mounted on a tubular journal 216 within the casing 200. Pivotally mounted on the disk 215 are a number of radially swinging levers 217 forming together an annular series of levers. The longer arm of each of said levers engages a radial slot 218 formed in a dial 250 attached to the disk 215. Said dial is provided with concentric scores 219 corresponding to different speeds. The rear ends of the levers 217 are adapted upon the rotation of the disk 215 to successively engage the guide-way 209 to be thereby set into positions corresponding to the speed of the vehicle at the moments at which the shorter arms of the levers are disengaged from the narrow end of the guide-way 209. To maintain the levers 217 in their set positions a spring 220 is provided individual to each lever, said springs engaging a surface 221 of the respective levers concentric to the journal of the levers. The springs are held out of engagement with their respective surfaces 221 by a stationary guiding surface or cam 222 during the passage of the respective levers through the guide-way 209 in order to enable the setting of the levers to take place without exerting any perceptible resistance against the movement of the governor. In order that the deflection of the governor may bear a directly proportional relation to the speed variations of the vehicle a spring 223 is provided, perferably acting on the guide-way 209, one end of which is fixed, while the other end is connected to a tape placed over a cam disk 224 carried by the hub of the guide-way 209.

In order to obtain in addition to the indication of the momentary speed during a certain, preferably, short distance, as represented by the levers 217, an indication of the maximum speed or any other predetermined speed during one or more, preferably, longer distances the following provisions are made.

Enclosed within the casing of the apparatus is a distance indicator constructed as an ordinary meter the number wheels of which are shown in dotted lines at 225 in Fig. 9. Such a number wheel is also shown in Fig. 11. Mounted at the side of said meter is a shaft 226, pivoted at its one end on the journal 227 (Fig. 10) and resting with its opposite end in a slot 228 formed in a bracket 229 in the direction of swinging of the said shaft. Rotatably mounted on the shaft 226 is a toothed segment 230, adapted to mesh in a toothed rim 231 on the disk 215. The shaft 226 carries further two rotatably mounted number wheel segments 232 and 233, see also Figs. 12 and 13. The hubs of the segments 230 and 232 are provided with cooperating clutch members 234 arranged to permit a certain play at the throwing in of the clutch as will appear at 235 in Fig. 10. The lower face of the segment 232 is engaged by a curved arm 236 mounted on the shaft 237 and formed integral with an arm 238 the free end of which extends into the path of a collar or shoulder 239 on the sleeve 207. A spring 240 (Fig. 10) tends to maintain the hub of the segment 232 in engagement with the arm 236. The segment 232, Fig. 12, is formed with a holding tooth 241 adapted to be engaged by a pawl 242 and is further provided with a stepping tooth 243 and a stop tooth 244 of which the latter is adapted to engage, a fixed stop pin 245. The segment 233, Fig. 13, is formed with a holding tooth 246 to be engaged by a spring operated pawl 247 and carries further a stepping pawl 248 adapted to engage the tooth 243 (Fig. 12) and a stop shoulder 249 adapted to engage the stop pin 245. A spring 256 tends to move the segment 232 towards the stop pin 245, and another spring 251 tends to move the segment 233 towards the said stop pin 245.

The segments 232 and 233 carry each a number indicating a predetermined speed above the maximum speed allowed. Said numbers will appear through apertures 252 and 253 formed in the front wall of the casing 200.

The pawls 242 and 247 cooperating with the segments 232 and 233, respectively, are formed with rear extensions 254 and 255, respectively, adapted to engage any appropriate wheel of the meter of the distance recorder, as, for instance, the wheel indicating the kilometres, in such a way that said wheel at each revolution will first release the pawl 247 and thereupon the pawl 242 or successively.

The detailed operation of the apparatus is as follows:

As long as the speed of the vehicle does not exceed the maximum speed allowed the arm 238 will be out of the path of the collar 239. The arm 236 will now hold the shaft 226 in moved position thereby keeping the segment 230 disengaged from the toothed rim 231. The apparatus is now in the position shown in which the rotation of the disk 215 has no influence on the apparatus. Both the segment 232 and the segment 233 show blank surfaces thereby indicating that the speed allowed has not been exceeded. Should the maximum speed allowed be exceeded, the arm 238 will be operated by the collar 239 and caused to swing around the journal 237, and the arm 236 will descend to allow the shaft 226 to move sufficiently to permit meshing of the toothed segment 230 into the toothed rim 231. Upon the continued rotation of disk 215 the segment 230 will thus also be rotated. Due to the play 235 the clutch 234 will not be put into action until after a certain rotation has been completed, as, for instance, after a rotation corresponding to 50 meters travelled by the vehicle. When the clutch 234 is thereupon thrown into action the segment 232 is also caused to partake in the rotation which may, for instance, take place in the direction indicated by the arrow shown on the wheel 230 in Fig. 11. After the segment 230 has been rotated to the utmost extent allowed by its teeth, the segment 232 is rotated to such an extent as to permit the pawl 242 to move behind the tooth 241 thereby locking the segment 232. Should the speed be reduced below the maximum speed allowed the collar 239 will allow restoration of the arm 238 under the action of a spring causing the arm 236 to move the shaft 226 so as to disengage the toothed segment from the toothed rim 231. The pawl 242, however, will retain the segment 232 in its set position in which it indicates that the maximum speed allowed has been exceeded. This position is maintained during the period of time during which the digit wheel 225 which controls the pawl 254 is moving between two transfer operations to the higher digit wheel succeeding the wheel 225. Should the said first-mentioned wheel, as assumed above, be the ten kilometre wheel, the segment 232 will indicate that a speed above the highest speed allowed has been reached during the ten kilometres last travelled. When the said digit wheel which controls the pawl 254, reaches the position in which it is adapted to move the next number wheel of the higher order of the distance meter to effect the transfer operation, a cam or other projection (not shown) on said wheel will act on the pawl 242 to cause the latter to release the segment 232 which is now rotated by its spring 256, until the tooth 244 strikes the stop 245. In this rotation the pawl 248 mounted on the segment 233 is caused also to rotate owing to its engagement by the stepping tooth 243. This causes also a rotation of the segment 233, and at the end of said rotation the pawl 247 will engage behind the tooth 246 and maintain the segment 233 in set position. The segment 233, when in this position, shows through the aperture 253 that the maximum speed allowed has been exceeded during a distance which comprises in the case assumed the ten kilometres travelled by the vehicle next before the distance indicated by the kilometre wheel. If the speed allowed be exceeded before the kilometre wheel has completed a further revolution, a new setting of the segment 232 is effected so that both the segment 232 and the segment 233 will show a speed not allowed, that is, the vehicle has reached too high speed both during the distance indicated by the kilometre wheel and during the ten kilometres preceding said distance. It is thus clear that the apparatus may in this way always permit a supervision of the speed of the vehicle during a distance that may amount to the twenty kilometres last travelled.

When the said wheel 225 again reaches its transfer position and both of the segments 232 and 233 indicate a speed above that allowed, the segment 233 should indicate a speed not allowed even after the transfer is completed, inasmuch as the indication of the segment 232 should be transferred to the segment 233, whereas the segment 232 should be restored to normal position. In such case the pawls 254 and 255 are in such a position as to cause the wheel 225, when performing the transfer operation, to first operate the pawl 255 causing it to release the segment 233 which is thereupon restored to normal due to the action of its spring. The wheel 225 will then operate the pawl 254 causing it to release the segment 232 to allow it to be restored to normal. In this movement the segment 233 is also moved as before to be thereby again moved to indicating position.

If no speed above the maximum speed allowed has been attained during the ten kilometres last travelled, such a speed, however, having been attained during the ten kilometres succeeding those last travelled so that in affecting transfer from the wheel 225 only segment 233 but not segment 232 is in set position, it is evident, that the segment 233 is restored to normal and is maintained there, as no restoration of the segment 232 is taking place.

It should be noted that the segments 232 and 233 may be made dependent on any number wheel desired of the distance meter or on any gearing driven from one of the shafts of the vehicle. It should further be noted that the detailed construction of the invention may differ from that shown in the drawings without departing from the principle of the invention.

While in the embodiment last described two indicating devices operating in succession, as represented by the segments of number wheels 232 and 233, are shown it should be observed that the number of such devices may be varied according to the requirements to allow an indication to be maintained during any desired number of successively travelled distances. The connection between the various segments of number wheels may in such case be arranged in a way similar to that described in connection with the segments 232 and 233.

What I claim is:—

1. In a speed indicator operated by a centrifugal governor driven by a wheel of a vehicle, a rotary member driven from said wheel, a plurality of radially movable indicating members on said rotary member, and connections between said centrifugal governor and said indicating members designed so as to successively adjust said indicating means under the control of the governor in agreement with the momentary speed of the vehicle the indicating members being arranged so as to indicate, when adjusted, the speed of the vehicle during a certain distance last travelled by the vehicle.

2. In a speed indicator operated by a centrifugal governor driven by a wheel of a vehicle, a rotary disk driven from said wheel, an annular series of indicating levers mounted in said disk so as to be able to swing radially therein, means under the control of said centrifugal governor to successively engage the levers of said series to set each lever into a position corresponding to the speed of the vehicle at the moment at which the lever is set, and a dial on which the levers, when adjusted, indicate the speed of the vehicle during a certain distance last travelled by the vehicle.

3. In a speed indicator operated by a centrifugal governor driven by a wheel of a vehicle, a rotary disk driven from said wheel, an annular series of indicating levers pivotally mounted on said rotary disk, a channel-shaped guide-way under the control of said governor adapted to be successively engaged by one ends of said levers, and a dial on which the other ends of the levers after the engagement of the levers with said guide-way indicate the speed of the vehicle during a certain distance last travelled by the vehicle.

4. In a speed indicator operated by a centrifugal governor driven by a wheel of a vehicle, a rotary disk driven from said wheel, an annular series of indicating levers mounted in said disk so as to be able to swing radially therein, means under the control of said centrifugal governor to successively engage the levers of said series to set each lever into a position corresponding to the speed of the vehicle at the moment at which the lever is set, means to lock each lever in set position, means to release said locking means immediately prior to the engagement of the respective lever into the said setting means, and a dial on which the levers, when in set positions, indicate the speed of the vehicle during a certain distance last travelled by the vehicle.

5. In a speed indicator operated by a centrifugal governor driven by a wheel of a vehicle, a rotary disk driven from said wheel, an annular series of indicating levers pivotally mounted on said rotary disk, a channel-shaped guide-way under the control of said governor adapted to be successively engaged by one ends of said levers, springs acting on each of the levers to maintain them in set positions, a stationary cam to release said springs from their engagement with the levers prior to the engagement of the levers into the said guide-way, and a dial on which the other ends of the levers after the engagement of the levers with said guide-way indicate the speed of the vehicle during a certain distance last travelled by the vehicle.

6. In a speed indicator operated by a centrifugal governor driven by a wheel of a vehicle, a rotary disk driven from said wheel, an annular series of indicating levers mounted in said disk so as to be able to swing radially therein, means under the control of said centrifugal governor to successively engage the levers of said series to set each lever into a position corresponding to the speed of the vehicle at the moment at which the lever is set, and a dial on which the levers when in set positions indicate the speed of the vehicle during a certain distance last travelled by the vehicle, said dial having radial slots each engaged by one of said levers to form a guide-way therefor.

7. In a speed indicator operated by a centrifugal governor driven by a wheel of a vehicle, means under the control of the governor to indicate the momentary speed of the vehicle, an indicating mechanism, means controlled by the governor to operate said mechanism when a certain speed of the vehicle is exceeded, means driven by the vehicle to restore said mechanism to normal at each time that the vehicle has travelled a certain distance, a second indicating mechanism adapted to be operated by the said first-mentioned mechanism at the restoration thereof, and means driven from the vehicle to restore said second mechanism after the vehicle has travelled a certain distance.

8. In a speed indicator operated by a centrifugal governor driven by a wheel of a vehicle, means controlled by the governor to indicate the momentary speed of the vehicle, a number wheel operated under the control of the governor when the vehicle exceeds a certain speed, automatically operating means to lock said number wheel in operated position, and means driven from the vehicle to release said locking means after the vehicle has travelled a certain distance.

9. In a speed indicator operated by a centrifugal governor driven by a wheel of a vehicle, means under the control of the governor to indicate the momentary speed of the vehicle, a series of number wheels, one of which is operated by the governor, when a certain speed of the vehicle is exceeded, means on each preceding number wheel to operate, as the number wheel is restored, the subsequent number wheel, means to lock each operated number wheel in set position, and means driven from the vehicle to release said locking means to allow the number wheel to restore to normal.

10. In a speed indicator operated by a centrifugal governor driven by a wheel of a vehicle, means under the control of said governor to indicate the momentary speed of the vehicle, an indicating mechanism, connections between said governor and said mechanism to operate said mechanism under the control of the governor when the vehicle exceeds a certain speed, said means being arranged to operate with a certain play corresponding to a certain distance travelled by the vehicle, and means to restore said mechanism to normal after the vehicle has travelled a certain distance.

In testimony whereof I have signed my name.

GUNNAR ELIAS CASSEL.